March 31, 1953     J. R. MOORE     2,633,569
GATING SYSTEM FOR CATHODE-RAY OSCILLOSCOPES
Filed Nov. 28, 1942     2 SHEETS—SHEET 1
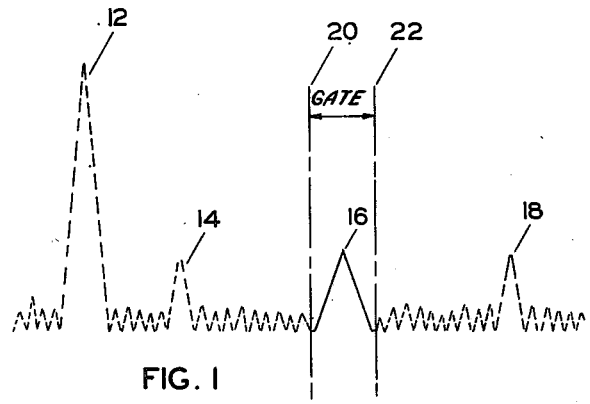
FIG. 1
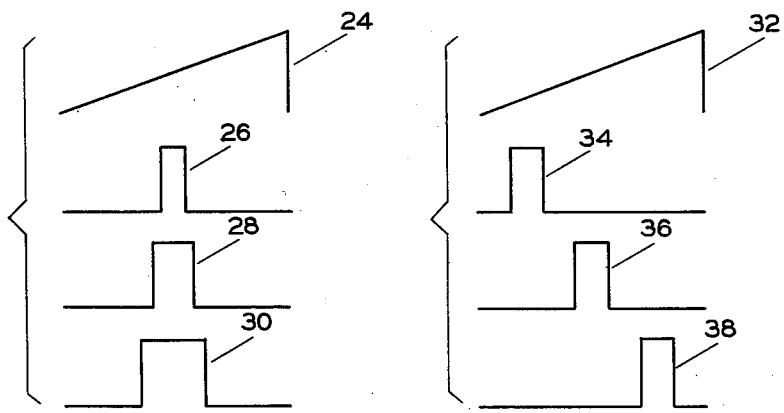
FIG. 2     FIG. 3
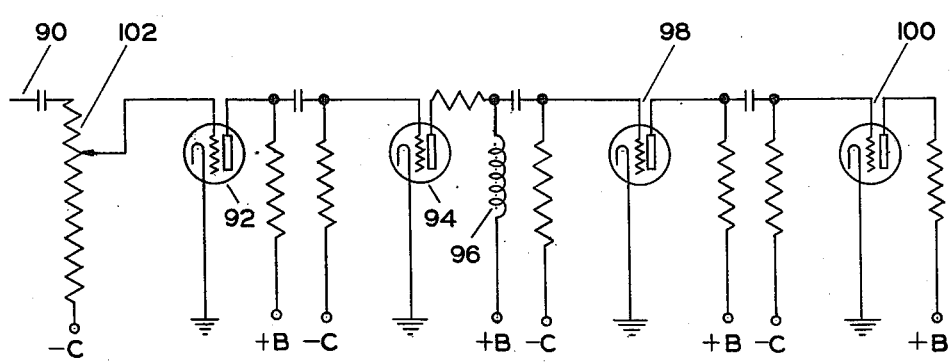
GATE WIDTH CONTROL     FIG. 5
INVENTOR
JAMES R. MOORE
BY William D. Hall
ATTORNEY March 31, 1953  J. R. MOORE  2,633,569
GATING SYSTEM FOR CATHODE-RAY OSCILLOSCOPES
Filed Nov. 28, 1942  2 SHEETS—SHEET 2

*INVENTOR*
JAMES R. MOORE
BY *William D. Hall*
*ATTORNEY*

Patented Mar. 31, 1953

2,633,569

UNITED STATES PATENT OFFICE 2,633,569

GATING SYSTEM FOR CATHODE-RAY OSCILLOSCOPES

James R. Moore, Rumson, N. J., assignor to the United States of America as represented by the Secretary of War Application November 28, 1942, Serial No. 467,267

10 Claims. (Cl. 343—13)

(Granted under Title 35, U. S. Code (1952), sec. 266)

The invention described herein may be manufactured and used by or for the Government for governmental purposes, without the payment to me of any royalty thereon.

This invention relates to cathode ray oscilloscopes in general, and also to such oscilloscopes used in pulse echo systems for locating and ranging.

The primary object of my invention is to generally improve cathode ray oscilloscope circuits. Another object is to generally improve pulse echo systems.

Pulse echo systems for locating and ranging commonly employ a cathode ray oscilloscope to show the echo peak. Reception is complicated by the locally transmitted radio pulse, and by the reception of numerous echo peaks from objects other than the one in which the operator is interested. There is also the common appearance of so-called "grass" along the base line of the oscilloscope, all adding to the difficulty and confusion of the operator.

One object of my invention is to overcome the foregoing difficulties by so controlling the signal transducer, in this case a cathode-ray oscilloscope, at the receiver, that it will discriminate in favor of a desired echo. This is done by normally maintaining the transducer inoperative and then rendering it operative during time of reception of the desired echo.

Another object of my invention is to overcome the foregoing difficulties and to blanket the oscilloscope at points along the base line other than at the echo peak of interest. In effect the oscilloscope is gated to present the echo response at only one part of the base line, and the response at all other parts of the base line is blanketed. This is done by applying a gate wave or bias wave to a control electrode in the oscilloscope, said gate wave having a relatively long negative portion adapted to cut off the electrode beam, and having a relatively short positive or gate portion adapted to pass the electron beam at one part of the base line.

A further object of my invention is to insure maintenance of proper synchronism between the gate wave and the sweep wave, and with this object in view I derive both the gate wave and the sweep wave from a single sine wave source. It is usual to provide a phase changer to shift the sweep or base line on the oscilloscope screen. This may be done to center a desired echo peak, or it may be done for ranging. In accordance with a further feature and object of my invention the phase changing means is located between the sine wave generator and both the sweep wave and gate wave generators, so that the gate is shifted with the desired echo peak, thus maintaining the gate at the desired echo peak regardless of shifts in the base line.

Another object of my invention is to make it possible to shift the location of the gate relative to the base line, thus making it possible to select which of a number of echo peaks is to be presented for observation and "tracking." For this purpose I provide an additional phase shifting mechanism between the aforesaid phase changer and the gate wave generator, the second phase shifter being operable independently of the first, and controlling only that portion of the sine wave energy which is fed to the gate wave generator.

It is desirable to be able to control not only the location of the gate along the base line, but also the width of the gate, and a further object of my invention is to provide suitable apparatus for that purpose, said apparatus preferably being associated with and forming a part of the gate wave generator or beam modulator.

While I have so far referred to my invention as applied to pulse echo systems, it will be understood that the provision of a gate of controllable width and controllable location on the screen of an oscilloscope is of general application to many oscilloscopes used for purposes other than pulse echo systems, and the invention is accordingly not intended to be limited to the latter.

To the accomplishment of the foregoing general objects and other more specific objects which will hereinafter appear, my invention resides in the method and apparatus elements and their relation one to the other as are hereinafter described in greater detail in the following specification. The specification is accompanied by a drawing in which Figure 1 is explanatory of the purpose of my invention;

Figure 2 schematically illustrates the effect of gate width control;

Figure 3 schematically illustrates the effect of the independent phase shifter for the gate wave;

Figure 5 is a wiring diagram showing one form of the gate wave generator with gate width control.

Figure 4:
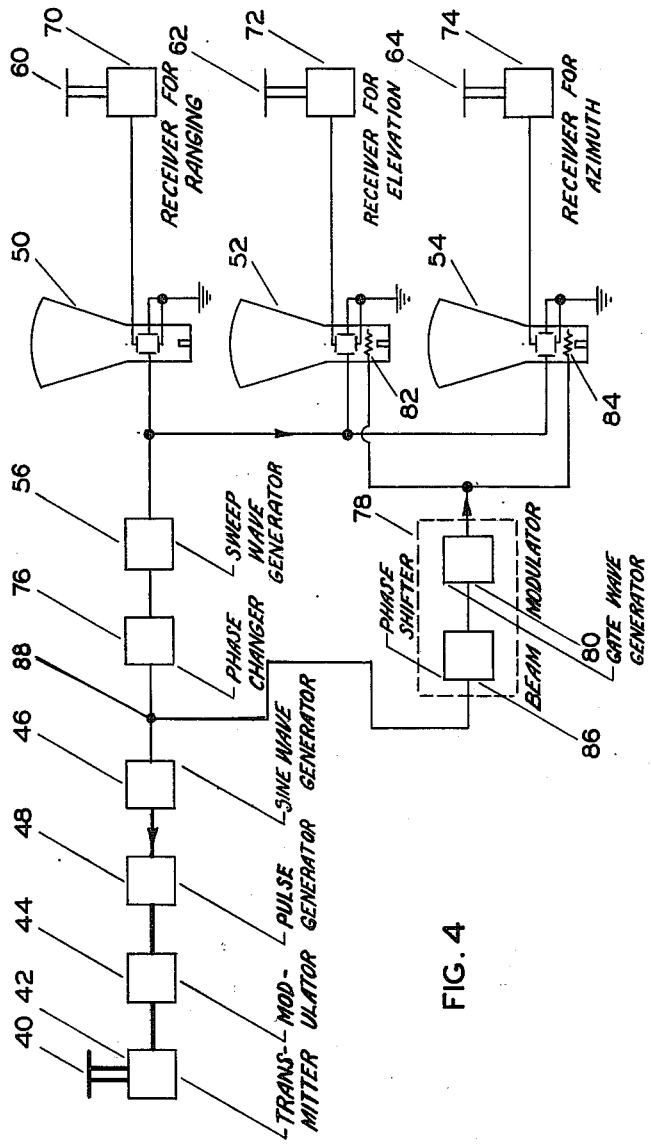
Figure 4 is a schematic diagram in block form showing how the invention may be applied to a typical pulse echo system for locating and ranging.

Referring to the drawings, and more particularly to Figure 1, I there show a typical screen trace found in the operation of a pulse echo system. The transmitter pulse produces a tall peak 12. Three main echo peaks are shown at 14, 16 and 18. These correspond to reflection of the transmitted radio wave from different objects, typically airplanes. In addition, there are numerous smaller peaks along the base line, commonly referred to as "grass." Sometimes the trace is confusing and it is difficult for the operator to distinguish a desired echo peak from other echo peaks and from the grass. In accordance with the present invention, the response of the oscilloscope is wiped out or blanketed at all points except between limits indicated by the broken lines 20 and 22. These constitute a so called gate or aperture through which the response pattern of the oscilloscope is admitted. The remaining peaks are all shown in broken lines to indicate that they are not visible. Peak 16 at the gate is shown in solid lines to indicate that this portion is visible. It will be evident that the task of tracking a particular object is greatly facilitated when only its echo peak is exposed on the screen surface.

Some form of gate width control is desirable, the purpose of this being schematically illustrated in Figure 2. A single tooth of the sweep wave is shown at 24. The positive pulse of the gate wave is shown at 26. It will be clear that for some purposes a narrow gate may be needed, as shown at 26, while in other instances a wider gate may be needed, as shown at 28 and 30.

It is also evident that the location of the gate along the base line should be variable, and this is schematically illustrated in Figure 3. A single tooth of the sweep wave is shown at 32, while the positive pulse of the gate wave may be shifted relative to the sweep wave, as shown by the successive positions 34, 36 and 38.

Referring now to the block diagram of Figure 4, a directional antenna transmitting array is indicated at 40. This is supplied by transmitter 42, the carrier wave of which is pulsed or modulated by modulator 44. The keying or pulse frequency is determined by a sine wave generator 46, the output of which is transformed to pulses by means of a pulse generator 48.

A portion of the sine wave energy from generator 46 is used to synchronously control the sweep of the oscilloscopes. In the present case there are three oscilloscopes, a ranging oscilloscope 50, oscilloscope 52 for elevation tracking, and oscilloscope 54 for azimuth tracking. For this purpose the sine wave is supplied to a sweep wave generator 56, typically a saw tooth wave generator. The reflected or echo energy is collected on a plurality of directional antenna arrays 60, 62 and 64, which in turn are respectively connected to receivers 70, 72 and 74. These are used respectively for ranging, elevation tracking, and azimuth tracking, and it will be understood that the outputs of the receivers are applied to deflection plates of the oscilloscopes 50, 52 and 54 in conventional fashion. For example, if the sweep potential is applied to horizontally deflecting plates of the oscilloscopes, the echo peak potentials are applied to vertically deflecting plates. A trace such as that shown in Figure 1 will tend to be produced on all three oscilloscopes. A phase changer 76 is disposed between sine wave generator 46 and sweep wave generator 56. This phase changer may be used to shift the base line on the screen of the oscilloscope, thus locating or centering the echo peaks. The phase changer may also be used for ranging by measuring the precise amount of change needed to shift from the transmitted peak 12 (Figure 1) to the echo peak 16, relative to a center line on the oscilloscope screen.

In accordance with the present invention, a portion of the energy from the sine wave generator 46 is supplied to a beam modulator 78. This comprises what may be termed a "gate wave" generator 80. The gate wave generator derives from the sine wave a synchronous wave which is substantially rectangular and which comprises a relatively long negative portion and a relatively short positive gate portion. The gate wave is applied to a control electrode 82 in oscilloscope 52, and to a control electrode 84 in oscilloscope 54. The gate wave might similarly be applied to the ranging oscilloscope 50, but I prefer not to gate or blanket the ranging oscilloscope because I consider it highly desirable to have one oscilloscope which presents the entire screen trace, so that a desired one of the echo peaks may be selected for tracking.

In order to locate the gate at the selected echo peak, usually at the center line as indicated above, to originally provide the proper adjustment I provide a variable phase shifter 86 in the beam modulator 78. This phase shifter affects only that portion of the sine wave energy which is supplied to the gate wave generator, and therefore shifts the gate pulse relative to the sweep wave and base line. The amount of phase shift introduced by phase shifter 86 in order to make the gate pulse coincide with a selected echo peak will also be indicative of the range to the object from which the echo is reflected. This is the shift illustrated in Figure 3 of the drawing.

It will be noted that the point 88 at which the sine wave energy is tapped for feed to the beam modulator 78 follows the phase shifter 76. This is important because in the event of any movement of phase shifter 76 causing movement along the base line of the transmitter peak and base line, the gate is automatically moved with respect to the base line, thus remaining in proper relation to the selected echo peak. Since movement of echo peaks may be due to change in actual range or setting of phase changer, the gate may be said to present whatever is selected at or near the center line of the range oscilloscope.

One specific form of gate wave generator circuit is illustrated in Figure 5 of the drawing. Referring to this figure, the sine wave energy is supplied at the point 90 and is applied to the control electrode of an amplifier tube 92, the output of which is supplied thru suitable resistance coupling to another amplifier tube 94. The latter tube is selected to saturate at the potential applied thereto, causing it to swing beyond the knee of the characteristic curve of the tube when the grid swings positive. The tube is so biased that the negative swing of the grid goes beyond the cut off point of the tube. As a result the wave is flattened at the top and the bottom, producing an approximately square wave. The slope of the sides of the wave is very steep if the amplitude of the applied wave is very much larger than that of the output wave, but is at an angle (less steep) if the amplitude of the applied wave is only moderately larger than that of the output wave. The output wave is then changed to a pulse wave by the use of inductance coupling shown at 96. The tube 98 thus acts as a pulse generator, the output of which is supplied to a power amplifier tube 100, which amplifies the pulse to the necessary magnitude for application to the control grid of the oscilloscope.

The magnitude of the sine wave applied to the gate wave generator is controlled by means of a potentiometer 102. This control varies the amplitude of the sine wave relative to the limited or flattened output wave of the tube 94, and so determines the slope of the sides of the flattened output wave.

This in turn determines the sharpness or width of the pulse derived by the $$L\frac{di}{dt}$$

method referred to heretofore. In this way the potentiometer 102 acts as a gate width control, producing the effect illustrated in Figure 2 of the drawing. It will be noted that, although gating pulses 26, 28 and 30 in Figure 2 differ in width, their mean time of occurrence, and therefore the mean spacing between successive gating pulses is kept substantially constant.

It will be understood that the gate wave generator shown in Figure 5 corresponds to the block 80 in the block diagram of Figure 4. The phase shifter shown at 86 in Figure 4 may be of any conventional type, such as that using Helmholtz coils.

In one aspect, it may be said that the control electrode is normally biased negatively to cut off the electron beam, and that an intermittent positive pulse overcomes the bias. The block diagram of Figure 4 does not show details such as biasing means, but these are, of course, employed. From this standpoint the term "gate wave" may be considered as meaning the sum of the steady bias and the pulse. The resultant wave ordinarily has a relatively long negative portion and a relatively short positive portion.

Figure 6:
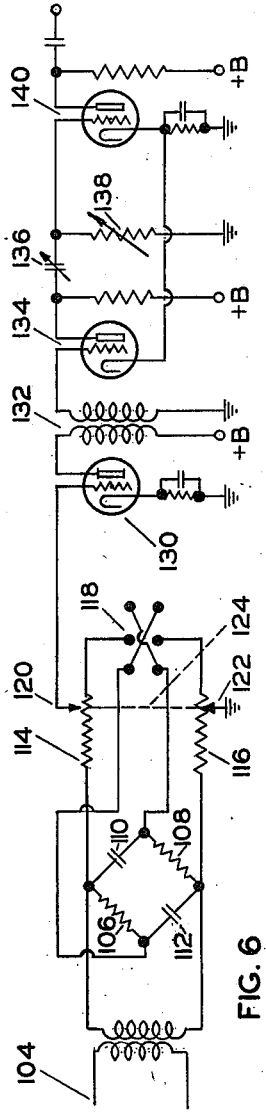
Figure 6 illustrates a modified form of gate wave generator with associated phase shifter.

Figure 6 illustrates another form of beam modulator, that is, phase shifter and gate wave generator. Referring to that figure the sine wave input at 104 is applied to the top and bottom corners of an RC bridge made up of resistors 106 and 108 and condensers 110 and 112. One end of each potentiometer resistor 114 and 116 is connected to each of one pair of conjugate terminals of the bridge and the other end of each potentiometer resistor is selectively connected through a polarity reversing switch, such as a double pole double throw switch with transposition connectors to permit the desired operation, to each of the other pair of conjugate terminals of the bridge, as shown.

Assuming that the poles of the switch 118 are thrown to the right, the potentiometer 114 is connected in shunt around the condenser 110, and the potentiometer 116 is connected in shunt around the condenser 112. The movable contacts 120 and 122 of the potentiometers are mechanically connected for simultaneous movement. (For example, with a rotating control they may be arranged on a common shaft.) This mechanical connection is schematically illustrated by the broken line connection 124 on the diagram. It will be evident that when contacts 120 and 122 are moved all the way to the right, the output is being taken at the left and right corners of the bridge, resulting in a substantial phase shift relative to the phase at the top and bottom corners of the bridge. As the contacts are moved back in opposite directions the effect of the capacitative phase shift is lessened, until finally when contacts 120 and 122 are moved all the way to the left, there is no change in phase at all, the connections being to the top and bottom of the bridge. By throwing the switch 118 to the left, the potentiometers are connected in shunt with the resistors of the bridge, instead of the condensers, thus providing a further range of phase shift.

The sine wave output from the phase shifting bridge is applied to a tube 130 which amplifies the sine wave and feeds the same through transformer 132 to a tube 134 selected to saturate at the top of the wave and biased to cut off at the bottom of the wave. The output of tube 134 is a flattened wave, which is converted to a pulse wave by means of an RC circuit comprising a condenser 136 and a resistance 138. The sharpness or width of the pulse depends on the time constant of the RC circuit relative to the frequency of the sine wave. This may be varied by making either the condenser 136 or resistor 138, or both, variable as shown. This produces the desired gate width control shown in Figure 2.

The pulse wave or gate wave is amplified by an amplifier tube 140, the output of which is supplied to the control electrode of the oscilloscope.

It should be understood that while I have shown simple triodes in the wiring diagrams of Figures 5 and 6, in actual practice the tubes will ordinarily be pentode tubes or other multiple electrode tubes having greater efficiency for work with high frequencies of the order here contemplated.

It is believed that the construction and operation of my improved gate system for cathode ray oscilloscopes, as well as the many advantages thereof, will be apparent from the foregoing detailed description. It will be understood that the use of a gate or aperture of variable width and variable location on the oscilloscope screen is valuable in fields other than pulse echo systems. The invention is of particular value in connection with pulse echo systems, and is illustrated as applied to such systems for that reason, and also by way of exemplification of the invention, but not in limitation thereof.

It will therefore be apparent that while I have shown and described my invention in several preferred forms, many changes and modifications may be made without departing from the spirit of the invention, as sought to be defined in the following claims. In some of the claims I refer to the gate being located at a desired echo peak, but this is not intended to exclude the illumination of two or more peaks where desired. For example, in locating objects by so called "double tracking," two immediately adjacent and preferably overlapping or slightly "spread" echo peaks are simultaneously visible for comparison with one another. The gate is located at this slightly spread pair of peaks.

I claim:

1. In the operation of an oscilloscope having a control grid, the method of presenting only a desired portion of the trace while excluding all other response, which includes generating a sine wave, deforming a portion of the sine wave energy into a sweep wave for the oscilloscope, deriving a relatively rectangular bias potential wave from a portion of the aforesaid sine wave energy, said bias potential wave having a relatively long portion adapted to cut off the electron beam and so blanket the oscilloscope, and having a relatively short gate portion adapted to pass the electron beam at one point along the base line while blanketing the same at other points along the base line, applying said gate wave to a control grid in the oscilloscope, whereby change in phase of the sine wave with consequent shift in the base line of the oscilloscope trace is accompanied by a corresponding shift in the location of the gate portion of the gate wave, and independently shifting the phase of that portion of the sine wave used for generating the gate wave when it is desired to shift the location of the gate relative to the base line in order to properly locate the gate at a desired point.

2. In the location of objects by means of a pulse echo system having an oscilloscope to show the echo peaks, the method of presenting only a desired echo peak while excluding all other response, which includes generating an approximate sine wave, deforming a portion of the sine wave energy into a saw tooth sweep wave for the oscilloscope, deriving a relatively rectangular bias potential wave from a portion of the aforesaid sine wave energy, said bias potential wave having a relatively long negative portion adapted to cut off the electron beam and so blanket the oscilloscope, and having a relatively short positive gate portion adapted to pass the electron beam at one part of the base line while blanketing the same at other parts of the base line, applying said gate wave to a control grid in the oscilloscope, whereby change in phase of the sine wave with consequent shift in the base line and echo peaks is accompanied by a corresponding shift in the location of the gate portion of the gate wave, and independently phase shifting the portion of the sine wave used for generating the gate wave when it is desired to shift the location of the gate relative to the base line in order to properly locate the gate at a desired echo peak.

3. In combination, an oscilloscope having sweep electrodes and a control electrode, an approximate sine wave generator, a sweep wave generator deriving a sweep wave from a portion of the sine wave energy, connections applying the sweep wave to the sweep electrodes of the oscilloscope, a gate wave generator for deriving a bias or gate wave from another portion of the aforesaid sine wave energy, connections applying said gate wave to the control grid of the oscilloscope, said gate wave having a relatively long portion adapted to cut off the electron beam and so blanket the oscilloscope, and having a relatively short gate portion adapted to pass the electron beam at one point along the base line while blanketing the same at other points along the base line, and a phase changer disposed between the aforesaid sine wave generator and the sweep and gate wave generators for shifting the base line of the oscilloscope together with the gate portion of the gate wave.

4. In combination, an oscilloscope having sweep electrodes and a control electrode, an approximate sine wave generator, a sweep wave generator deriving a sweep wave from a portion of the sine wave energy, connections applying the sweep wave to the sweep electrodes of the oscilloscope, a gate wave generator for deriving a bias or gate wave from another portion of the aforesaid sine wave energy, connections applying said gate wave to the control grid of the oscilloscope, said gate wave having a portion adapted to cut off the electron beam and so blanket the oscilloscope and having a gate portion adapted to pass the electron beam at one part of the base line while blanketing the same at other parts of the base line, a phase changer disposed between the aforesaid sine wave generator and the sweep and gate wave generators for shifting the base line of the oscilloscope together with the gate portion of the gate wave, and an independent phase shifter disposed between the aforesaid phase changer and the gate wave generator in order to independently shift the location of the gate relative to the base line, so as to locate the gate at a desired point.

5. In combination, an oscilloscope having sweep electrodes and a control electrode, an approximate sine wave generator, a sweep wave generator deriving a sweep wave from a portion of the sine wave energy, connections applying the sweep wave to the sweep electrodes of the oscilloscope, a gate wave generator for deriving a bias or gate wave from another portion of the aforesaid sine wave energy, connections applying said gate wave to the control grid of the oscilloscope, said gate wave having a portion adapted to cut off the electron beam and so blanket the oscilloscope, and having a gate portion adapted to pass the electron beam at one point along the base line while blanketing the same at other points along the base line, a phase changer disposed between the aforesaid sine wave generator and the sweep and gate wave generators for shifting the base line of the oscilloscope together with the gate portion of the gate wave, and gate width control mechanism associated with said gate wave generator for determining the width of the gate.

6. In combination, an oscilloscope having sweep electrodes and a control electrode, an approximate sine wave generator, a sweep wave generator deriving a sweep wave from a portion of the sine wave energy, connections applying the sweep wave to the sweep electrodes of the oscilloscope, a gate wave generator for deriving a bias or gate wave from another portion of the aforesaid sine wave energy, connections applying said gate wave to the control grid of the oscilloscope, said gate wave having a portion adapted to cut off the electron beam and so blanket the oscilloscope, and having a gate portion adapted to pass the electron beam at one point along the base line while blanketing the same at other points along the base line, a phase changer disposed between the aforesaid sine wave generator and the sweep and gate wave generators for shifting the base line of the oscilloscope together with the gate portion of the gate wave, an independent phase shifter disposed between the aforesaid phase changer and the gate wave generator in order to independently shift the location of the gate relative to the base line so as to locate the gate at a desired point, and gate width control mechanism associated with said gate wave generator for determining the width of the gate.

7. Apparatus for locating objects by means of pulse echo, said apparatus comprising a transmitter, a receiver, an oscilloscope having sweep electrodes, deflecting electrodes, and a control electrode, connections to feed the receiver output to the deflecting electrodes, an approximate sine wave generator, a pulse generator deriving a pulse from a portion of said sine wave energy, a keyer driven by the pulse generator for keying the transmitter, a sweep wave generator for deriving a sweep wave from a portion of the sine wave energy, connections applying the sweep wave to the sweep electrodes of the oscilloscope, a gate wave generator for deriving a bias or gate wave from another portion of the aforesaid sine wave energy, connections applying said gate wave to the control grid of the oscilloscope, said gate wave having a relatively long portion adapted to cut off the electron beam and so blanket the oscilloscope, and having a relatively short gate portion adapted to pass the electron beam at one part of the base line while blanketing the same at other parts of the base line, a phase changer disposed between the aforesaid sine wave generator and the sweep and gate wave generators for shifting the base line of the oscilloscope and the echo peaks thereon together with the gate portion of the gate wave.

8. Apparatus for locating objects by means of pulse echo, said apparatus comprising a transmitter, a receiver, an oscilloscope having sweep electrodes, deflecting electrodes, and a control electrode, connections to feed the receiver output to the deflecting electrodes, an approximate sine wave generator, a pulse generator deriving a pulse from a portion of said sine wave energy, a keyer driven by the pulse generator for keying the transmitter, a sweep wave generator for deriving a sweep wave from a portion of the sine wave energy, connections applying the sweep wave to the sweep electrodes of the oscilloscope, a gate wave generator for deriving a bias or gate wave from another portion of the aforesaid sine wave energy, connections applying said gate wave to the control grid of the oscilloscope, said gate wave having a portion adapted to cut off the electron beam and so blanket the oscilloscope, and having a gate portion adapted to pass the electron beam at one part of the base line while blanketing the same at other parts of the base line, a phase changer disposed between the aforesaid sine wave generator and the sweep and gate wave generators for shifting the base line of the oscilloscope and the echo peaks thereon together with the gate portion of the gate wave, and an independent phase shifter disposed between the aforesaid phase changer and the gate wave generator in order to independently shift the location of the gate relative to the base line so as to properly locate the gate at a desired echo peak.

9. Apparatus for locating objects by means of pulse echo, said apparatus comprising a transmitter, a receiver, an oscilloscope having sweep electrodes, deflecting electrodes, and a control electrode, connections to feed the receiver output to the deflecting electrodes, an approximate sine wave generator, a pulse generator deriving a pulse from a portion of said sine wave energy, a keyer driven by the pulse generator for keying the transmitter, a sweep wave generator for deriving a sweep wave from a portion of the sine wave energy, connections applying the sweep wave to the sweep electrodes of the oscilloscope, a gate wave generator for deriving a bias or gate wave from another portion of the aforesaid sine wave energy, connections applying said gate wave to the control grid of the oscilloscope, said gate wave having a portion adapted to cut off the electron beam and so blanket the oscilloscope, and having a gate portion adapted to pass the electron beam at one part of the base line, a phase changer disposed between the aforesaid sine wave generator and the sweep wave generator for shifting the base line of the oscilloscope with respect to the echo peaks thereon and the gate portion of the gate wave, a phase changer disposed between the sine wave generator and the gate wave generator to selectively shift the location of the gate relative to the base line to locate the gate at a desired echo peak and gate width control mechanism associated with said gate wave generator for determining the width of the gate.

10. Apparatus for locating objects by means of pulse echo, said apparatus comprising a transmitter, a receiver, an oscilloscope, having sweep electrodes, deflecting electrodes, and a control electrode, connections to feed the receiver output to the deflecting electrodes, an approximate sine wave generator, a pulse generator deriving a pulse from a portion of said sine wave energy, a keyer driven by the pulse generator for keying the transmitter, a sweep wave generator for deriving a sweep wave from a portion of the sine wave energy, connections applying the sweep wave to the sweep electrodes of the oscilloscope, a gate wave generator for deriving a bias or gate wave from another portion of the aforesaid sine wave energy, connections applying said gate wave to the control grid of the oscilloscope, said gate wave having a relatively long portion adapted to cut off the electron beam and so blanket the oscilloscope, and having a relatively short gate portion adapted to pass the electron beam at one part of the base line, a phase changer disposed between the aforesaid sine wave generator and the sweep wave generator for shifting the base line of the oscilloscope with respect to the echo peaks thereon and the gate portion of the gate wave, an independent phase shifter disposed between the aforesaid sine wave generator and the gate wave generator in order to independently shift the location of the gate relative to the base line so as to properly locate the gate at a desired echo peak, and gate width control mechanism associated with said gate wave generator for determining the width of the gate.

JAMES R. MOORE.

REFERENCES CITED

The following references are of record in the file of this patent:

UNITED STATES PATENTS

| Number | Name | Date |
|---|---|---|
| 2,189,549 | Hershberger | Feb. 6, 1940 |
| 2,280,524 | Hansen | Apr. 21, 1942 |
| 2,405,238 | Seeley | Aug. 6, 1946 |
| 2,405,239 | Seeley | Aug. 6, 1946 |
| 2,406,316 | Blumlein | Aug. 27, 1946 |
| 2,411,572 | Hershberger | Nov. 26, 1946 |
| 2,416,088 | Deerhake | Feb. 18, 1947 |
| 2,416,089 | Jones | Feb. 18, 1947 |
| 2,417,136 | Smith | Mar. 11, 1947 |
| 2,453,970 | Charrier | Nov. 16, 1948 |
| 2,470,464 | Bowie | May 17, 1949 |
| 2,534,862 | Fox | Dec. 19, 1950 |